United States Patent [19]
Fujihira et al.

[11] Patent Number: 5,518,823
[45] Date of Patent: May 21, 1996

[54] ALUMINUM FOIL AS ELECTROLYTIC CONDENSER ELECTRODES

[75] Inventors: Tadao Fujihira; Masashi Sakaguchi; Kiyoshi Tada; Makoto Tanio, all of Osaka; Eizo Isoyama, Nara, all of Japan

[73] Assignee: Showa Aluminum Kabushiki, Osaka, Japan

[21] Appl. No.: 304,261

[22] Filed: Sep. 12, 1994

Related U.S. Application Data

[63] Continuation-in-part of Ser. No. 803,016, Dec. 4, 1991, abandoned.

[30] Foreign Application Priority Data

| Dec. 11, 1990 | [JP] | Japan | 2-401397 |
| Dec. 11, 1990 | [JP] | Japan | 2-401399 |
| Dec. 11, 1990 | [JP] | Japan | 2-401401 |

[51] Int. Cl.⁶ .............................. H01G 9/04; C22C 21/00
[52] U.S. Cl. .................... 428/610; 428/629; 428/606; 428/654; 361/529
[58] Field of Search ..................... 148/239; 428/606, 428/610, 629, 654; 361/509, 529, 528

[56] References Cited

U.S. PATENT DOCUMENTS

| 3,997,339 | 12/1976 | Fickelscher | 420/528 |
| 4,510,207 | 4/1985 | Mehada et al. | 428/654 |
| 5,128,836 | 7/1992 | Fukuoka et al. | 361/529 |

FOREIGN PATENT DOCUMENTS

| 2804572 | 5/1979 | Denmark | 361/529 |
| 62-198112 | 9/1987 | Japan | 361/529 |
| 63-288008 | 11/1988 | Japan . | |
| 1-290217 | 11/1989 | Japan | 428/654 |
| 3-150821 | 6/1991 | Japan | 361/529 |
| 5-315199 | 11/1993 | Japan | 361/529 |
| 734524 | 8/1955 | United Kingdom | 361/529 |
| 2041647 | 9/1990 | United Kingdom | 361/529 |

OTHER PUBLICATIONS

European Search Report EP 91 31 1298, Mar. 1992.

*Primary Examiner*—Ngoo-yen Nguyen
*Attorney, Agent, or Firm*—Tilton, Fallon, Lungmus & Chestnut

[57] ABSTRACT

An aluminum foil to be etched for use as the electrolytic condenser electrodes is composed of a foil body of an aluminum purity of 99.9% or higher, and an oxide layer 20–70 Å thick and formed due to contact of the foil body with an oxidizing atmosphere. At least one etching nuclei-forming element is concentrated in a boundary region and/or in an outermost surface region of the oxide layer, the boundary region being disposed between the foil body and the oxide layer, and both the regions having a thickness of 20 Å or less. The ratio in ion intensity of a maximum concentration of the elements in these regions to a concentration of the elements in the inner layer of the foil body is 1.2–30. There are three patterns in distribution of the elements, so that the maximum concentration is in a predetermined ratio to the concentration in the surface region, the inner layer or a minimum concentration appearing between the regions. The foil will be etched to be ready for use as the electrolytic condenser electrodes.

12 Claims, 6 Drawing Sheets

ALUMINUM FOIL AS ELECTROLYTIC CONDENSER ELECTRODES

This application is a continuation-in-part of application Ser. No. 07/803,016 filed Dec. 4, 1991 now abandoned.

BACKGROUND OF THE INVENTION

1. Field of the Invention

The present invention relates to an aluminum foil which is used as the electrodes in electrolytic condensers, and more particularly which is used as anodes in the middle- or high-voltage electrolytic condensers, and further relates to a method of making the aluminum foil.

2. Description of Prior Art

Many research works have been conducted in order that the density of the etching pits may be increased, wherein the etching pits are formed by electrically or electrochemically etching the surfaces of the aluminum foils for use as the electrolytic condenser electrodes so as to increase their effective surface area and thus their capacitance per unit area. Among such recent works, a study reported on the Japanese Patent Publication Sho. 62-42370 has developed a new technology in which the foil surface layer is enriched with at least one of Pb (lead), Bi (bismuth) and In (indium). This technology is based on such a knowledge that composition and fine structure of the aluminum foil surface layer is a key factor determining the etching pit density. In detail, compounds of at least one of Pb, Bi and In are applied to the foil surface layers, and thermal diffusion process is carried out at temperatures above the melting points of these metals, and annealing process may subsequently be conducted according to the common practice, if necessary.

OBJECTS AND SUMMARY OF THE INVENTION

An object of the present invention, which resulted from the present inventors' research conducted along the line suggested in the recently developed technology, is therefore to provide an aluminum foil as the electrolytic condenser electrodes, which foil is formed with its surface layer thus containing such metal elements as to maximize the effective surface area with the most desirable distribution and concentration.

In order to achieve this object, the most suitable 'etching nuclei-forming elements' (hereinafter often referred to simply as 'nuclei-forming elements') are selected to be distributed at a specifically enriched concentration in the most desirable portion of the aluminum foil.

From a first aspect of the invention, the object is achieved with an aluminum foil to be etched for use as the electrolytic condenser electrodes and comprising a foil body and an oxide layer covering the foil body, which layer is 20–70 Å thick and formed due to contact of the foil body with an oxidizing atmosphere, wherein the foil body comprises 99.9% by weight or more of Al (aluminum) as well as a predetermined content of at least one 'nuclei-forming' element selected from a Group consisting of Cu (copper), Zn (zinc), Mn (manganese), Ga (gallium), P (phosphorous), V (vanadium), Ti (titanium), Cr (chromium), Ni (nickel), Ta (tantalum), Zr (zirconium), C (carbon), Be (beryllium), Pb, In, and rare-earth (i.e., lanthanoid series) elements, wherein a maximum concentration of the element is present in a boundary region having a thickness of about 20 Å or less and being formed across an interface between the foil body and the oxide layer, so that a concentration of said element decreases from the boundary region towards the foil body and also towards the oxide layer, and being uniform throughout an inner layer of the foil body, the inner layer being a remainder of the foil body from which an upper portion thereof and the oxide layer are subtracted by 0.1 µm in depth measured from an outer surface of the oxide layer, and wherein an ion intensity ratio of the maximum concentration of the nuclei-forming element to a concentration thereof in the inner layer is 1.2–30, and the ion intensity ratio of the maximum concentration to a concentration of said element on the outer surface must be higher than 1.0 but 20 or less. This aluminum foil may subsequently be etched before use as the electrolytic condenser electrodes, within the scope of the present invention.

From a second aspect of the invention, the object is achieved with an aluminum foil to be etched for use as the electrolytic condenser electrodes and comprising a foil body and an oxide layer covering the foil body, which layer is 20–70 Å thick and formed due to contact of the foil body with an oxidizing atmosphere, wherein the foil body comprises 99.9% by weight or more of Al as well as a predetermined content of at least one nuclei-forming element selected from a group consisting of Cu, Zn, Mn, Ga, P, V, Ti, Cr, Ni, Ta, Zr, C, Be, Pb, In and rare-earth elements, wherein a maximum concentration of the element is present in an outermost surface region of the oxide layer, the outermost region having a thickness of about 20 Å or less, so that the concentration of said elements decreases from the outermost region towards the foil body, and being uniform throughout an inner layer of the foil body, the inner layer being a remainder of the foil body from which an upper portion thereof and the oxide layer are subtracted by 0.1 µm in depth measured from the outermost region of the oxide layer, and wherein an ion intensity ratio of the maximum concentration of the nuclei-forming element to a concentration thereof in the inner layer must be 1.2–30, and the ion intensity ratio of the maximum concentration to a concentration of said element on an interface disposed between the oxide layer and the foil body must be 1.1–28. The aluminum foil may subsequently be etched before use as the electrolytic condenser electrodes, within the scope of the present invention.

From a third aspect of the invention, the object is achieved with an aluminum foil to be etched for use as the electrolytic condenser electrodes and comprising a foil body and an oxide layer covering the foil body, which layer is 20–70 Å thick and formed due to contact of the foil body with an oxidizing atmosphere, wherein the foil body comprises 99.9% by weight or more of Al as well as a predetermined content of at least one nuclei-forming element selected from a group consisting of Cu, Zn, Mn, Ga, P, V, Ti, Cr, Ni, Ta, Zr, C, Be, B (boron), Mg (magnesium), Pb, In, Bi and rare-earth elements, wherein a maximum concentration of the element is present in a boundary region having a thickness of about 20 Å or less and being formed across an interface between the foil body and the oxide layer, and the maximum concentration being also present in an outermost surface region of the oxide layer, the surface region having a thickness of about 20 Å or less, with a minimum concentration of said element being present between the outermost surface region and the boundary region, so that the concentration of said element decreases from the boundary region towards the foil body, and being uniform throughout an inner layer of the foil body, the inner layer being a remainder of the foil body from which an upper portion thereof and the oxide layer are subtracted by 0.1 µm in depth measured from an outer surface of the oxide layer, and wherein an ion intensity ratio of the maximum concentration of the nuclei-forming element to a concentration thereof in the inner layer must be 1.2–30, and the ion intensity ratio of the maximum concentration to the minimum concentration must be 1.1–20. This aluminum foil may subsequently be etched before use as the electrolytic condenser electrodes, within the scope of the present invention.

Other objects, features and advantages of the invention will become clear from the following description which will be made referring to the accompanying drawings.

DETAILED DESCRIPTION OF THE INVENTION

First Mode of the Invention

Figure 1:
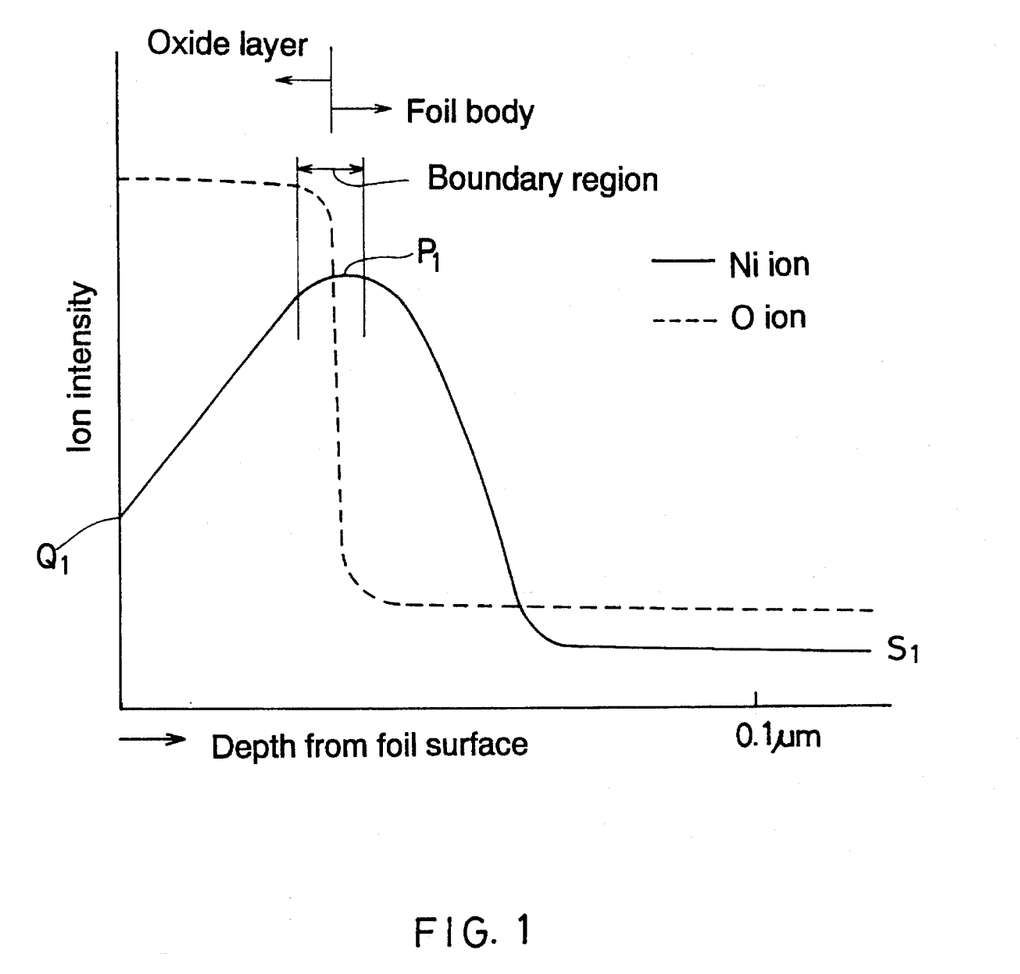
FIG. 1 is a graph showing an ion intensity for example of Ni, the intensity being detected through a surface portion of an aluminum foil provided in a first mode and for use as the electrolytic condenser electrodes.
Figure 2:
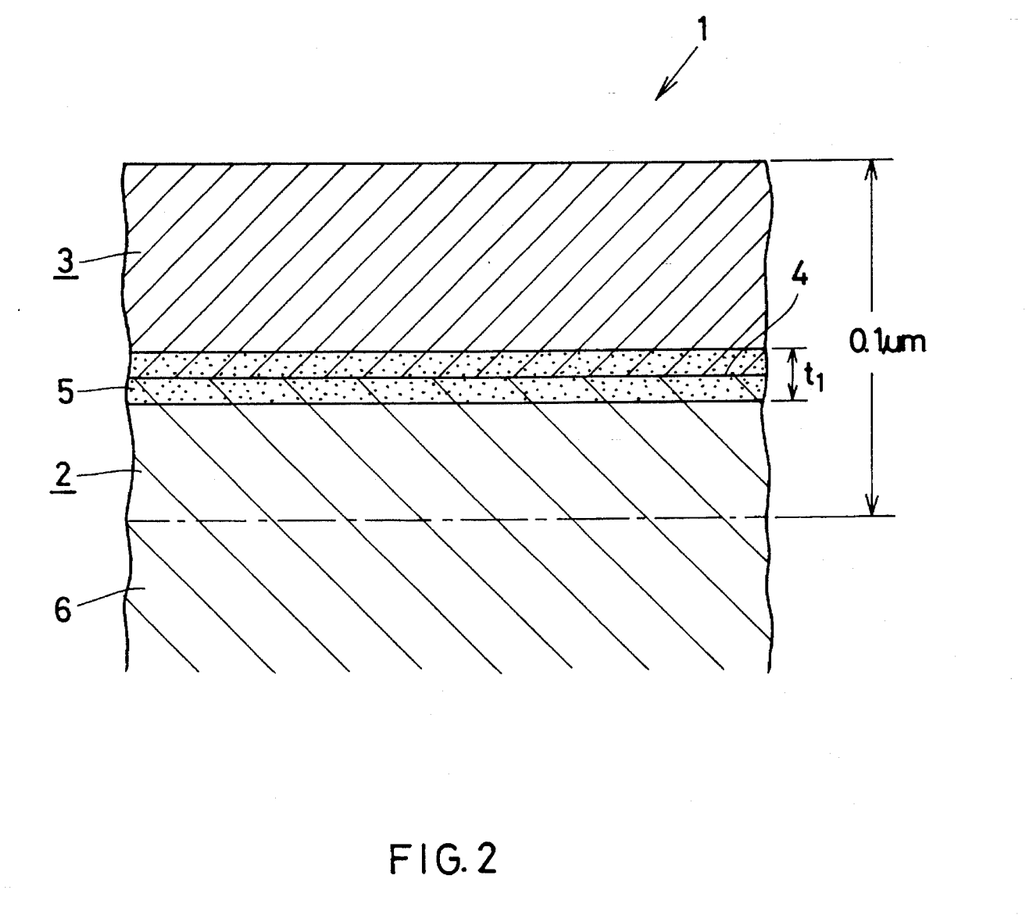
FIG. 2 is an enlarged cross section of the foil's principal portion in the first mode.

In a first mode, one or more etching nuclei-forming elements are concentrated in a boundary region 5 having a thickness $t_1$ of about 20 Å or less and being formed across an interface 4 of an aluminum foil body 2 and an oxide layer 3. The thickness $t_1$ may preferably be 10 Å or less, and more preferably 5 Å or less.

An aluminum foil 1 provided herein does comprise the oxide layer 3 covering the foil body 2. The oxide layer 3 is not an anodized membrane or the like produced in an electrolytic solution, but is such a membrane as produced spontaneously in air or in any oxidizing atmosphere which contains an amount of oxygen gas, during storage or during an annealing process. The oxide layer must be 20–70 Å thick, because the layer of a thickness less than 20 Å is too thin to allow the local concentration of the nuclei-forming elements to function to a sufficient extent. The oxide layer of a thickness more than 70 Å is however too thick to be dissolved and removed during an etching process, also failing to ensure the expected effect of the locally concentrated nuclei-forming elements. Thus, it is more preferable that the oxide layer 3 be 30–50 Å thick.

Aluminum purity of the foil body 2 of aluminum foil must be 99.9% by weight or higher, because a lower purity, that is a higher content of impurities will hinder the etching pits from growing into deep tunnel-shaped pits, the electrolytic etching process thereby failing to enhance capacitance. Therefore, it is desired to employ a raw aluminum foil containing 99.98% by weight or more of aluminum.

At least one kind of nuclei-forming elements is contained at a high concentration in the boundary region 5, in a state as shown in FIGS. 1 and 2. This is a key factor to enhance the capacitance of aluminum foil. The element or elements will function as the etching nuclei to produce a sufficient number of the etching pits, which will grow deep towards the inside of the foil. Fine tunnels thus produced will give a larger effective surface area to the foil.

A maximum concentration $P_1$ of the nuclei-forming element appears in the boundary region 5, which is interposed between the foil body 2 and the oxide layer 3, as shown in FIG. 1. This means that a concentration of said element decreases from the boundary region 5 towards the foil body 2 and also towards the oxide layer 3, and being uniform throughout an inner layer 6 of the foil body 2. This inner layer 6 is a remainder of the foil body from which an upper portion thereof and the oxide layer are subtracted by 0.1 μm in depth. The oxide layer comprises an outermost surface region, and the depth being defined as a depth measured from an outer surface of the oxide layer. An ion intensity ratio of the maximum concentration $P_1$ of the nuclei-forming element present in the boundary region 5 to a concentration $S_1$ thereof present in the inner layer 6 of the foil body 2 must be 1.2–30. The ion intensity ratio of the maximum concentration $P_1$ to a concentration $Q_1$ of said element present on the outer surface of the oxide layer 3 must be higher than 1.0 but 20 or less. In a case wherein a value of the ratio $P_1/S_1$ in ion intensity is below 1.2 or the other ratio $P_1/Q_1$ in ion intensity is 1.0 or less, then a resultant insufficient density of the etching pits will not increase the effective surface area to a sufficient degree. On the other hand, the ratio $P_1/S_1$ higher than 30 or the other ratio $P_1/Q_1$ higher than 20 will remarkably reduce the corrosion resistance of the foil surface. This will in turn result in an excessively high density of the etching pits, whereby the adjacent pits will merge into huge pits such that a substantially entire surface of the foil will dissolve into an etching bath and the effective surface area decreases undesirably. Thus, a more desirable ion intensity ratio $P_1/S_1$ for the boundary region 5 is 3–25, and most preferably 10–20. A more desirable ion intensity ratio $P_1/Q_1$ is 3–18, and most preferably 5–15.

The ion intensity (alternatively referred to as 'ion strength') is defined as an amount of atoms which are ready to ionize, per unit mass. The concentration of the nuclei-forming elements can be determined by measuring the ion intensity. The so-called 'ion microanalyzer' (i.e., IMA) may be used to measure the ion intensity, under the conditions of: Ar$^+$ as the primary ion; the beam diameter of 500 μm; the acceleration voltage of 10 kV; and electric current of 0.3 μA. The IMA-S type apparatus made by Hitachi & Co., Ltd. is an example available to this measurement.

The etching nuclei-forming elements are selected from a group consisting of Cu, Zn, Mn, Ga, P, V, Ti, Cr, Ni, Ta, Zr, C, Be, Pb, In and rare-earth elements. The rare-earth elements herein are seventeen elements which include fifteen elements having the atomic numbers 57–71 (that is, La, Ce, Pr, Nd, Pm, Sm, Eu, Gd, Tb, Dy, Ho, Er, Tm, Yb and Lu) in addition to Y (yttrium) and Sc (scandium). These elements in the first mode of the invention are equivalent to each other in respect of their function to improve the surface area-increasing effect of the etching process. It is not necessary to use any selected element alone but two or more elements may be used together. As for the rare-earth elements, the so-called 'misch metal' (M.M.), which is produced by electrolysis of a mixture of chlorides of two or more rare-earth elements, may be employed. From a practical point of view, one or more of Y, La, Ce, Pr, Nd, Sm and misch metal may preferably be used in any combination, because they can be procured more easily than the others.

In case of using Cu, Zn, Mn and/or Ga, it is desirable that these elements are contained at a concentration (or a sum of concentrations for two or more elements used in combination) of 3–60 ppm in the foil's inner layer 6. In another case of using P, V, Ti, Cr, Ni, Ta, Zr, C and/or Be, the concentration is desirably set at 1–40 ppm, however this concentration being set at 0.01–3 ppm in still another case of using Pb, In and/or any one or more of rare-earth elements. In any case, a concentration below the lower limit will bring about insufficient formation of the etching pits, while a higher concentration above the upper limit causes an excessive etching.

More preferable concentrations of those elements in the inner layer 6 are: 10–30 ppm for Cu, Zn, Mn and/or Ga; 5–25 ppm for P, V, Ti, Cr, Ni, Ta, Zr, C and/or Be; and 0.2–1.5 ppm for Pb, In and/or rare-earth elements.

In manufacture of such an aluminum foil that is enriched with the etching nuclei-forming elements distributed in the described manner, predetermined amounts of one or more of the nuclei-forming elements are added to an aluminum ingot which is melted to be cast through a die. Subsequently, the cast raw sheet will be hot-rolled, intermediate-annealed if necessary, and further rolled to form a raw foil. This raw foil will then be subjected to the final annealing process for example in vacuum at 450°–550° C. for 1–30 hours, more preferably at 470°–520° C. for 3–10 hours. Finally, an appropriate process such as the 'ion implantation process' is carried out to incorporate predetermined amounts of the elements described above into the boundary region 5, which region is between the foil body 2 and the oxide layer 3 spontaneously formed thereon. The amounts of the nuclei-forming elements which have been implanted to the foil are diffused selectively to the boundary region 5 so as to be concentrated therein in accordance with the invention.

The foil thus prepared will then be etched to provide a finished foil for use as the electrolytic condenser electrodes. The conditions of the etching process need not be specific, but conventional ones may be adopted, wherein the etching of foil will be completed smoothly to thereby significantly increase the effective surface area. If the foil is dipped in a pretreatment bath containing sodium hydroxide before the etching process, then the etching effect will further be improved, avoiding any undesirable uniform dissolution of the foil's outermost surface layer.

Thus, the etched aluminum foil is given a sufficiently high capacitance, a good electrical property and a high mechanical strength.

Second Mode of the Invention

Figure 3:
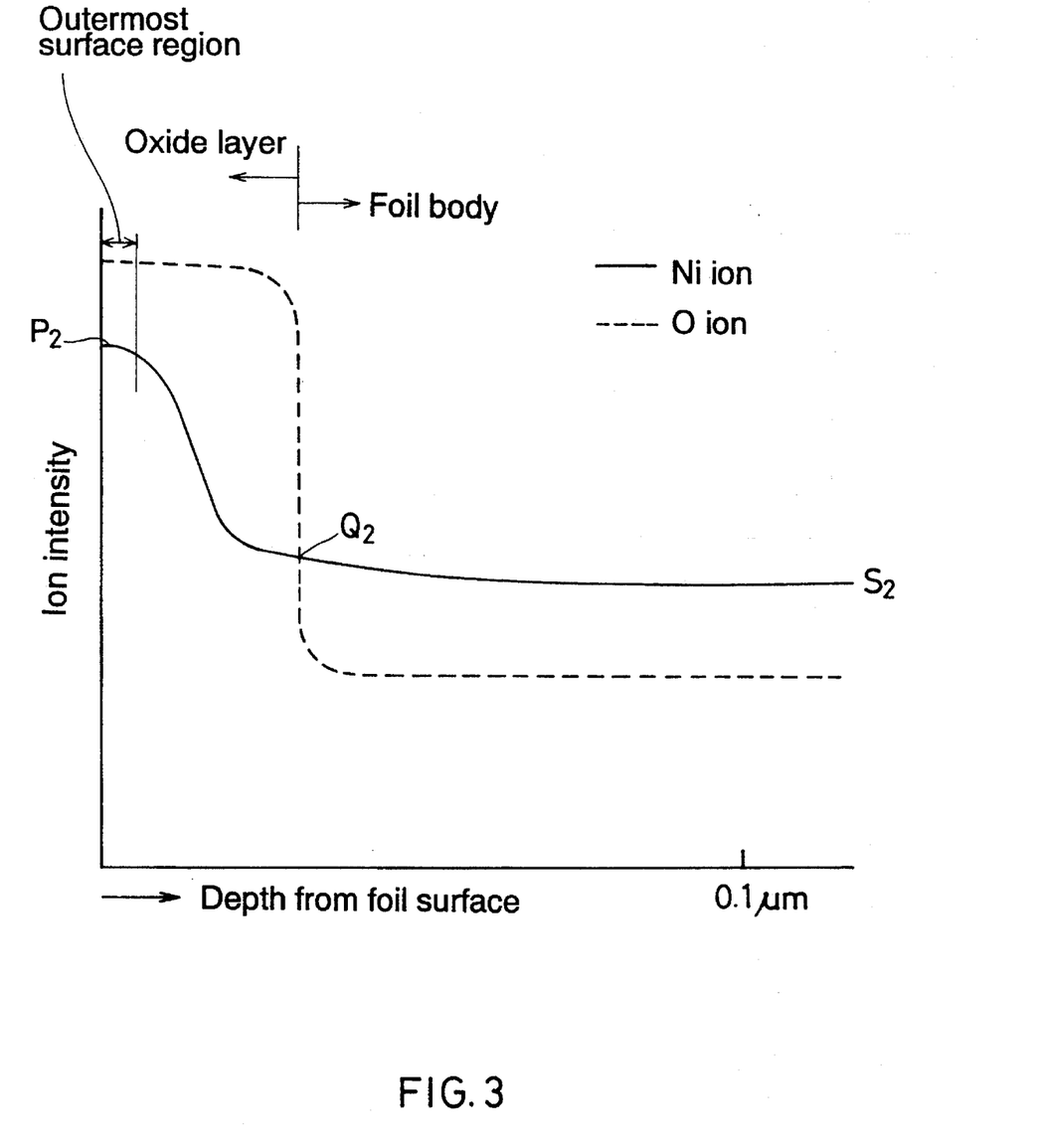
FIG. 3 is a graph showing an ion intensity for example of Ni, the intensity being detected through a surface portion of an aluminum foil provided in a second mode and for use as the electrolytic condenser electrodes.
Figure 4:
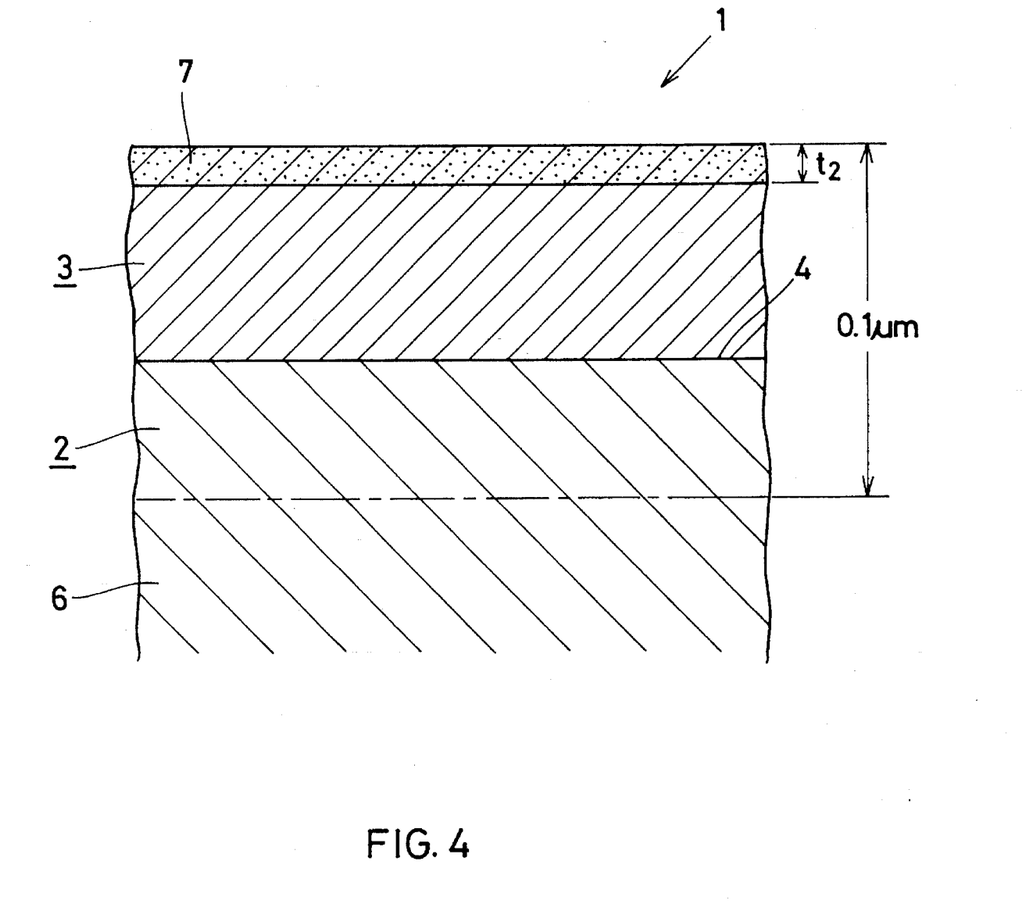
FIG. 4 is an enlarged cross section of the foil's principal portion in the second mode.

In a second mode shown in FIGS. 3 and 4, one or more etching nuclei-forming elements are concentrated in an outermost surface region 7 of an oxide layer 3. The outermost region 7 has a thickness $t_2$ of about 20 Å or less, more preferably 10 Å or less, or most preferably 5 Å or less.

Similar to the aluminum foil 1 in the first mode, the oxide layer 3 in the second mode covering the foil body 2 is a layer which will be spontaneously formed in an oxidizing air or gas. The oxide layer 3 must be 20–70 Å thick, and aluminum purity of the foil body 2 must be 99.9% by weight or higher, more preferably 99.98% by weight or higher.

At least one kind of nuclei-forming elements is contained at a high concentration in the outermost surface region 7 of the oxide layer 3, in a state as shown in FIGS. 3 and 4. This is a key factor to enhance the capacitance of aluminum foil, similar to the foil provided in the first mode. The element(s) will behave as a great number of fine defects. At the beginning stage of the etching process, an infinite number of etched pits will be produced, originating from the fine defects, and subsequently growing deep towards the inside of the foil. Fine tunnels thus produced will give a larger effective surface area to the foil.

A maximum concentration $P_2$ of the nuclei-forming element appears in the outermost surface region 7 of the oxide layer 3, as shown in FIG. 3. This means that a concentration of said element decreases from the surface region 7 towards the foil body 2, and being uniform throughout an inner layer 6 of the foil body 2. This inner layer 6 is a remainder of the foil body from which an upper portion thereof and the oxide layer are subtracted by 0.1 μm in depth measured from an outer surface of the oxide layer. An ion intensity ratio of the maximum concentration $P_2$ of the nuclei-forming element present in the surface region 7 to a concentration $S_2$ thereof present in the inner layer 6 of the foil body 2 must be 1.2–30. The ion intensity ratio of the maximum concentration $P_2$ to a concentration $Q_2$ of said element present on an interface between the oxide layer 3 and the foil body 2 must be 1.1–28. In a case wherein a value of the ratio $P_2/S_2$ in ion intensity is below 1.2 or the other ratio $P_2/Q_2$ in ion intensity is below 1.1, then a resultant insufficient density of the etching pits will not increase the effective surface area to a sufficient degree. On the other hand, the ratio $P_2/S_2$ higher than 30 or the other ratio $P_2/Q_2$ higher than 28 will remarkably reduce the corrosion resistance of the foil surface. This will in turn result in an excessively high density of the etching pits, whereby the adjacent pits will merge into huge pits such that a substantially entire surface of the foil will dissolve into an etching bath and the effective surface area decreases undesirably. Thus, a more desirable ion intensity ratio $P_2/S_2$ for the surface region 7 is 3–25, and most preferably 10–20. A more desirable ion intensity ratio $P_2/Q_2$ is 3–18, and most preferably 8–15.

The ion intensity is of the same meaning and measured in the same way as in the first mode.

The etching nuclei-forming elements are selected from a group consisting of Cu, Zn, Mn, Ga, P, V, Ti, Cr, Ni, Ta, Zr, C, Be, Pb, In and rare-earth elements. These elements in the second mode of the invention are equivalent to each other in respect of their function to improve the surface area-increasing effect of the etching process. Any one element may be used alone, or alternatively two or more elements may be used together.

In case of using Cu, Zn, Mn and/or Ga, it is desirable that these elements are contained at a concentration (or a sum of concentrations for two or more elements used in combination) of 3–60 ppm in the foil's inner layer 6. In another case of using P, V, Ti, Cr, Ni, Ta, Zr, C and/or Be, the concentration is desirably set at 1–40 ppm, however this concentration being set at 0.01–3 ppm in still another case of using Pb, In and/or any one or more of rare-earth elements. In any case, a concentration below the lower limit will bring about insufficient formation of the etching pits, while a higher concentration above the upper limit causes an excessive etching.

More preferable concentrations of those elements in the inner layer 6 are: 10–30 ppm for Cu, Zn, Mn and/or Ga; 5–25 ppm for P, V, Ti, Cr, Ni, Ta, Zr, C and/or Be; and 0.2–1.5 ppm for Pb, In and/or rare-earth elements.

In manufacture of such an aluminum foil that is enriched with the etching nuclei-forming elements distributed in the described manner, predetermined amounts of one or more of the nuclei-forming elements are added to an aluminum ingot which is melted to be cast through a die. Subsequently, the cast raw sheet will be hot-rolled, intermediate-annealed if necessary, and further rolled to form a raw foil. This raw foil will then be washed and subjected to the final annealing process for example in vacuum at 450°–550° C. for 1–30 hours, more preferably at 470°–520° C. for 3–10 hours. An appropriate process such as the 'sputtering', 'wet plating' or 'ion implantation' is then carried out to apply predetermined amounts of the elements onto the surface of the oxide layer 3 spontaneously formed to cover the foil body 2. Finally, the re-heating of the foil will be conducted in vacuum at 300°–550° C. for 0.2–10 hours, more preferably at 400°–500° C. for 1–3 hours. The amounts of the nuclei-forming elements applied to the surface of oxide layer 3 are thus selectively concentrated in the outermost surface region 7 in accordance with the invention.

The foil thus prepared will then be etched to provide a finished foil for use as the electrolytic condenser electrodes. The conditions of the etching process need not be specific, but conventional ones may be adopted, wherein the etching of foil will be completed smoothly to thereby significantly increase the effective surface area. The second mode is most useful and effective in a case wherein no pretreatment is done before the etching. Any undesirable uniform dissolution of the foil's outermost surface layer is avoided also herein.

Thus, the etched aluminum foil is Given a sufficiently high capacitance, a Good electrical property and a high mechanical strength.

Third Mode of the Invention

Figure 5:
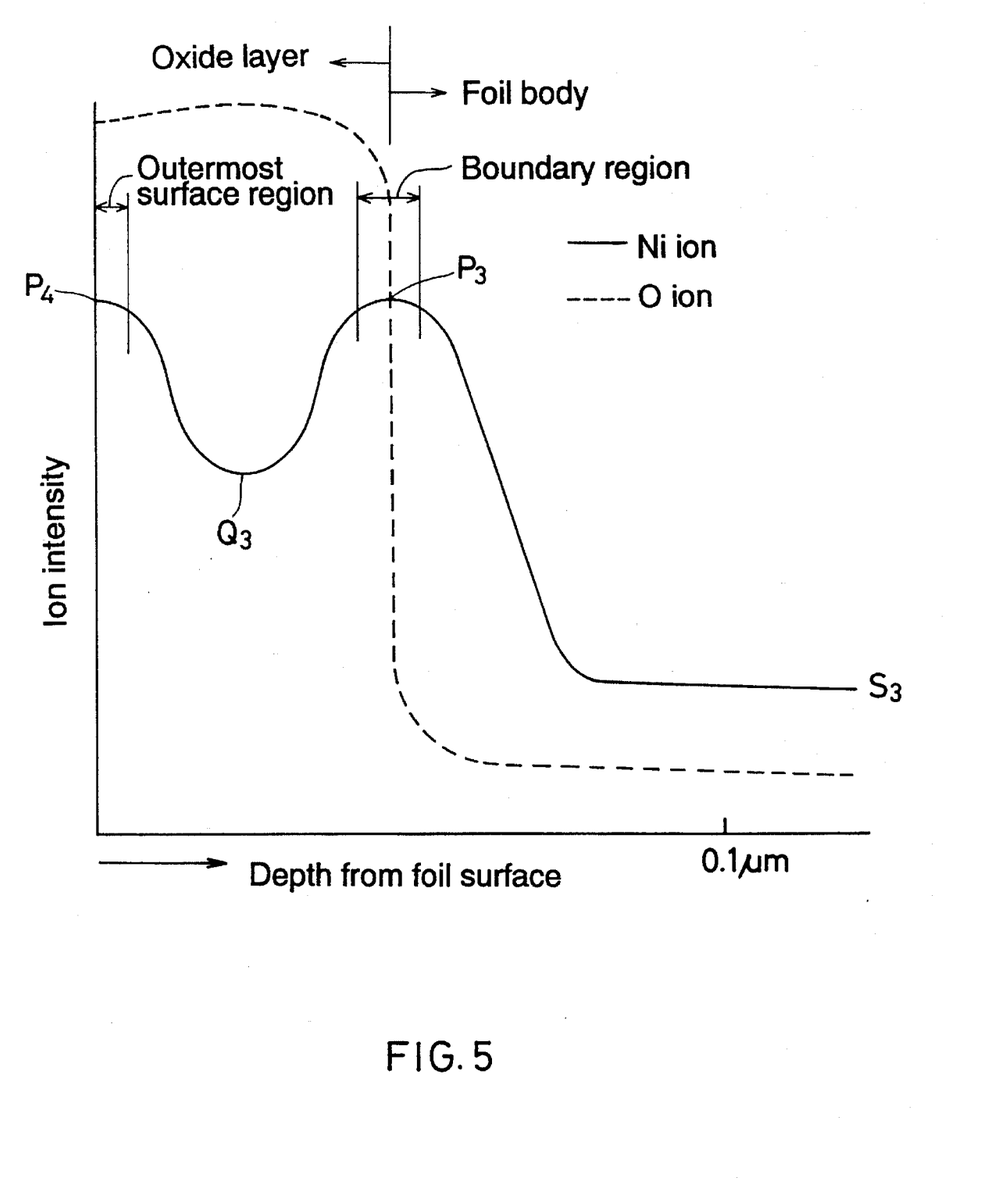
FIG. 5 is a graph showing an ion intensity for example of Ni, the intensity being detected through a surface portion of an aluminum foil provided in a third mode and for use as the electrolytic condenser electrodes.
Figure 6:
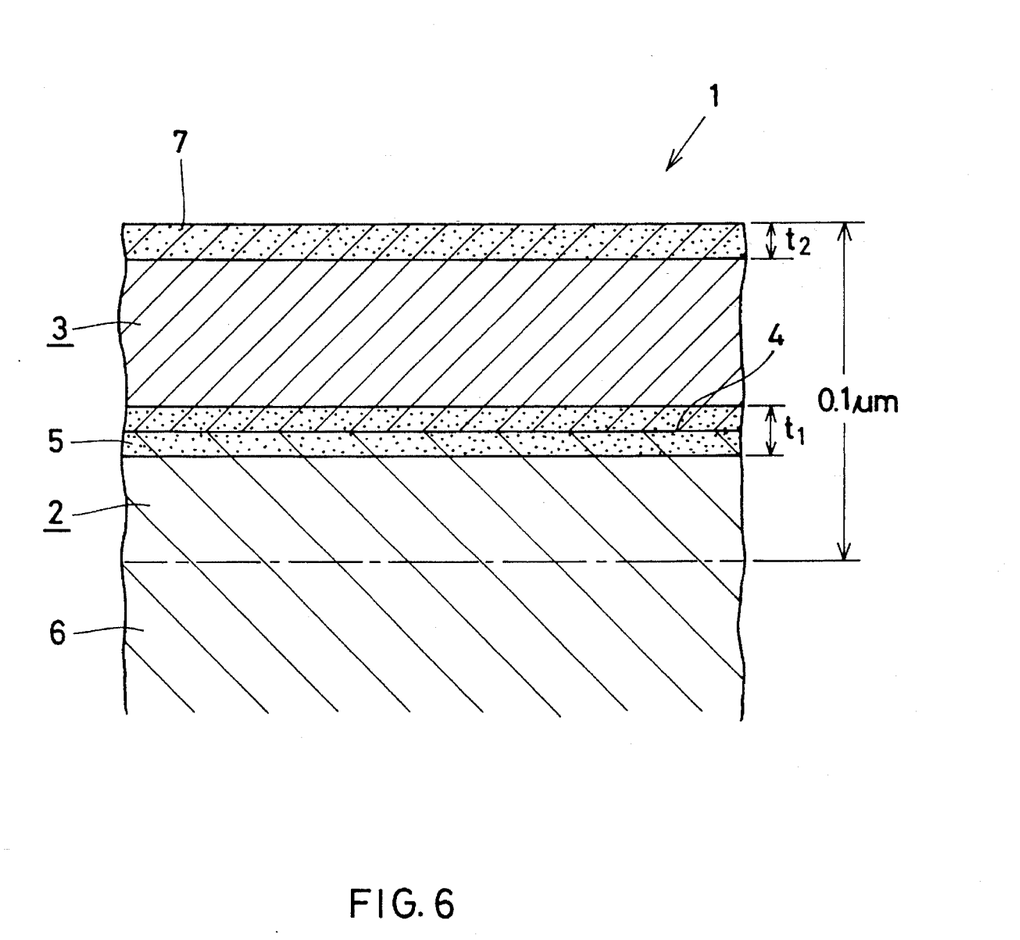
FIG. 6 is an enlarged cross section of the foil's principal portion in the third mode.

In a third mode shown in FIGS. 5 and 6, one or more etching nuclei-forming elements are concentrated: not only in a boundary region 5 between a foil body 2 and an oxide layer 3; but also in an outermost surface region 7 of the oxide layer 3. The boundary region 5 is formed across an interface of the foil body and the oxide layer and has a thickness $t_1$ of 20 Å or less. The outermost region 7 also has a thickness $t_2$ of about 20 Å or less, and each of the regions 5 and 7 is preferably 10 Å thick or less, or more preferably 5 Å thick or less.

Similar to the aluminum foils 1 in the first and second modes, the oxide layer 3 in the third mode covering the foil body 2 is a layer which will spontaneously be formed in an oxidizing air or Gas. The oxide layer 3 must be 20–70 Å thick, and aluminum purity of the foil body 2 must be 99.9% by weight or higher, more preferably 99.98% by weight or higher.

At least one kind of nuclei-forming elements is contained at a high concentration in the boundary region 5 and in the outermost surface region 7, in a state as shown in FIGS. 5 and 6. This is a key factor to enhance the capacitance of aluminum foil, similar to the foil provided in the first and second modes. The element or elements in the surface region 7 will behave as a great number of fine defects. At the beginning stage of the etching process, an infinite number of etched pits will be produced, originating from the fine defects, and subsequently growing deep towards the inside of the foil. Fine tunnels will thus be produced, until they reach the boundary region 5, and the elements concentrated therein will subsequently function as the etching nuclei to grow the tunnels and give a larger effective surface area to the foil.

A maximum concentration $P_3$ of the nuclei-forming element appears in the boundary region 5, and another or the same maximum concentration $P_4$ appearing in the outermost region 7 as shown in FIG. 5. This means that a minimum concentration $Q_3$ appears between the regions 5 and 7, whereas a concentration of said element decreases from the boundary region 5 towards the foil body 2, and being uniform throughout an inner layer 6 thereof. This inner layer 6 is a remainder of the foil body from which an upper portion thereof and the oxide layer are subtracted by 0.1 μm in depth measured from an outer surface of the oxide layer 3. An ion intensity ratio of the maximum concentrations $P_3$ and $P_4$ of the nuclei-forming element respectively present in the regions 5 and 7 to a concentration $S_3$ of said element in the inner layer 6 must be 1.2–30. The ion intensity ratio of said maximums $P_3$ and $P_4$ to the minimum concentration $Q_3$ must be 1.1–20. In a case wherein values of the ratio $P_3/S_3$ and $P_4/S_3$ are below 1.2 or the other ratio $P_3/Q_3$ and $P_4/Q_3$ are below 1.1, then a resultant insufficient density of the etching pits will not increase the effective surface area to a sufficient degree. On the other hand, the ratios $P_3/S_3$ and $P_4/S_3$ higher than 30 or the other ratios $P_3/Q_3$ and $P_4/Q_3$ higher than 20 will remarkably reduce the corrosion resistance of the foil surface. This will in turn result in an excessively high density of the etching pits, whereby the adjacent pits will merge into huge pits such that a substantially entire surface of the foil will dissolve into an etching bath and the effective surface area decreases undesirably. Thus, more desirable ion intensity ratios $P_3/S_3$ and $P_4/S_3$ respectively for the boundary region 5 and for the surface region 7 are 3–25, and most preferably 10–20. Further, more desirable ion intensity ratios $P_3/Q_3$ and $P_4/Q_3$ are 3–18, and most preferably 5–15.

The ion intensity is of the same meaning and measured in the same way as in the first mode.

The etching nuclei-forming elements are selected from a group consisting of Cu, Zn, Mn, Ga, P, V, Ti, Cr, Ni, Ta, Zr, C, Be, B, Mg, Pb, In, Bi and rare-earth ones.

These elements in the third mode of the invention are equivalent to each other in respect of their function to improve the surface area-increasing effect of the etching process. Similar to the preceding modes, any one element may be used alone, or alternatively two or more elements may be used in combination.

In case of using Cu, Zn, Mn and/or Ga, it is desirable that these elements are contained at a concentration (or a sum of concentrations for two or more elements used) of 3–60 ppm in the foil's inner layer 6. In another case of using P, V, Ti, Cr, Ni, Ta, Zr, C, Be, B and/or Mg, the concentration is desirably set at 1–40 ppm, however this concentration being set at 0.01–3 ppm in still another case of using Pb, In, Bi and/or rare-earth elements. In any case, a concentration below the lower limit will bring about insufficient formation of the etching pits, while a higher concentration above the upper limit causes an excessive etching.

More preferable concentrations of those elements in the inner layer 6 are: 10–30 ppm for Cu, Zn, Mn and/or Ga; 5–25 ppm for P, V, Ti, Cr, Ni, Ta, Zr, C, Be, B and/or Mg; and 0.2–1.5 ppm for Pb, In, Bi and/or rare-earth elements.

In manufacture of such an aluminum foil that is enriched with the etching nuclei-forming elements distributed in the described manner, predetermined amounts of one or more of the nuclei-forming elements are added to an aluminum ingot which is melted to be cast through a die. Subsequently, the cast raw sheet will be hot-rolled, intermediate-annealed if necessary, and further rolled to form a raw foil. This raw foil will then be subjected to the annealing process for example in vacuum at 450°–550° C. for 1–30 hours, more preferably at 470°–520° C. for 3–10 hours. An appropriate process of 'ion implantation' is then executed to incorporate the elements into the boundary region 5. Subsequently, another process such as the 'sputtering' or 'wet plating' is carried out to apply predetermined amounts of the elements onto the surface of the oxide layer 3 spontaneously formed to cover the foil body 2. Finally, the final heating of the foil will be conducted in vacuum at 200°–550° C. for 0.2–10 hours, more preferably at 300°–500° C. for 1–3 hours. The amount of the nuclei-forming elements implanted into the inside of the foil will thus be concentrated in the boundary region 5 between the foil body 2 and the oxide layer 3, whilst the amount of elements applied to the surface of oxide layer 3 will become selectively concentrated in the outermost surface region 7 in accordance with the invention.

The foil thus prepared will then be etched to provide a finished foil for use as the electrolytic condenser electrodes. The conditions of the etching process need not be specific, but conventional ones may be adopted, wherein the etching of foil will be completed smoothly to thereby significantly increase the effective surface area. The third mode is useful, whether or not any pretreatment for example in NaOH solution is done before the etching. Any undesirable uniform dissolution of the foil's outermost surface layer is avoided also herein.

Thus, the etched aluminum foil is given a sufficiently high capacitance, a good electrical property and a high mechanical strength.

THE PREFERRED EMBODIMENTS

First Embodiment

An aluminum ingot having a purity of 99.99% and containing 0.002% of Si and 0.002% of Fe was used as a raw material. One or more elements were selected, as shown on Table 1, from a group consisting of: Cu, Zn, Mn, Ga, P, V, Ti, Cr, Ni, Ta, Zr, C, Be, Pb, In and rare-earth elements. After a predetermined amounts of each selected element was added to the aluminum ingot so as to give the 'contents' as shown in Table 1, the ingot for each example was melted and cast to form a sheet. The sheets were then hot-rolled, intermediate-annealed, rolled into foils 0.1 mm thick, washed and annealed in vacuum at 490° C. for 4 hours. Then, 'ion implantation process' was carried out to incorporate predetermined amounts of the elements described above into a boundary region 5, which region was located between a foil body 2 and an oxide layer 3 spontaneously formed thereon. These foils were used to prepare the electrolytic condenser electrodes.

Thickness of the oxide layer 3 was measured for each sample, and ion intensity was measured in the direction of foil thickness to analyze the change in concentration of the implanted elements. A maximum concentration 'P' was detected in the boundary region 5 formed across an interface 4 and having a thickness of 5 Å or less, the interface being located between the foil body 2 and oxide layer 3. Concentration of said elements was found to decrease from said region 5 towards the foil body 2 and towards the oxide layer 3, but was constant within an inner layer 6 (deep from an outermost surface of oxide layer 3 by 0.1 μm or more) of the foil body.

Ion intensity ratios of the maximum concentration in the boundary region 5 to the concentration in the inner layer 6 and to the concentration on the outer surface of oxide layer were measured and calculated. Thickness of the oxide layer was measured according to the 'Hunter-Hall' method. Ion intensity was measured using a testing apparatus of the type 'IMA-S' made by Hitachi & Co., Ltd. Measurement was done with $Ar^+$ as the primary ion, with a beam diameter of 500 μm, at an acceleration voltage of 10 kV and with a current of 0.3 μA. Data obtained are listed in Table 1.

Next, the raw foils were dipped for 2 seconds in a bath of 1% NaOH at 50° C. Subsequent to this dipping process, the raw foils were subjected to a first etching process at 85° C. for 60 seconds in an etching solution of 5% HCl and 15% $H_2SO_4$, with a current density of DC 20 A/dm². Then, the foils were etched again in a second etching process which was conducted at 85° C. for 8 minutes in another etching solution of 5% HCl and 0.1% oxalic acid, with a current density of DC 5 A/dm².

TABLE 1

| | | Elements in foil body | | Oxide layer | Ion intensity ratios | | Capacitance |
|---|---|---|---|---|---|---|---|
| | | (*1) | (ppm) | (Å) | $P_1/S_1$ (*2) | $P_1/Q_1$ (*3) | (%) |
| Examples | | | | | | | |
| 1 | | Cu | 19 | 45 | 14 | 7.3 | 109 |
| 2 | | Zn | 47 | 43 | 27 | 15.7 | 104 |
| 3 | | Mn | 39 | 43 | 25 | 10.6 | 103 |
| 4 | | Ga | 23 | 42 | 13 | 9.8 | 106 |
| 5 | | P | 17 | 38 | 6.2 | 2.3 | 109 |
| 6 | | V | 23 | 44 | 8.1 | 7.6 | 107 |
| 7 | | Cr | 11 | 43 | 17 | 9.2 | 105 |
| 8 | | Ti | 14 | 41 | 6.1 | 3.9 | 106 |
| 9 | | Ni | 13 | 41 | 7.2 | 4 | 108 |
| 10 | | Ta | 15 | 42 | 7.2 | 3.5 | 106 |
| 11 | | Zr | 12 | 39 | 9.1 | 8.2 | 105 |
| 12 | | C | 19 | 40 | 8.8 | 7.5 | 104 |
| 13 | | Be | 11 | 50 | 5.8 | 4.6 | 104 |
| 14 | | P | 10 | 47 | 7.2 | 2.8 | 104 |
| | and | V | 15 | | 8.8 | 3.1 | |
| 15 | | Pb | 0.3 | 48 | 16 | 14 | 105 |
| 16 | | In | 0.7 | 45 | 22 | 20.6 | 106 |
| 17 | | Y | 0.2 | 46 | 8.8 | 7.3 | 104 |
| 18 | | La | 0.5 | 44 | 13 | 11 | 104 |
| 19 | | Ce | 0.4 | 44 | 19 | 10.3 | 103 |
| 20 | | Pr | 0.3 | 40 | 8.2 | 4.1 | 104 |

TABLE 1-continued

|  |  | Elements in foil body | | Oxide layer | Ion intensity ratios | | Capacitance |
|---|---|---|---|---|---|---|---|
|  |  | (*1) | (ppm) | (Å) | $P_1/S_1$ (*2) | $P_1/Q_1$ (*3) | (%) |
| References | and | MM | 0.5 |  | 5.5 | 3.3 |  |
| 21 |  | Cu | 15 | 44 | 38 | 26.3 | 98 |
| 22 |  | In | 0.7 | 40 | 44 | 35 | 100 |
| 23 |  | Ni | 13 | 43 | 48 | 31 | 92 |
| 24 |  | Ni | 13 | 43 | 5.4 | 0.1 | 96 |

Notes:
(*1) MM = 'misch metal'
(*2) $P_1/S_1$ = boundary/inner layer
(*3) $P_1/Q_1$ = boundary/outer surface The so-called 'forming treatment' of the etched foils was carried out with a voltage of 380 V. Capacitance of the finished foils was measured to give a result shown in Table 1, wherein capacitance is represented in percentage taking the value for the Reference 22 as 100%.

As will be seen from Table 1, each electrode foil containing, in the boundary region 5 between the foil body 2 and the oxide layer 3 thereon, one or more etching nuclei-forming elements at an amount defined in the invention had a capacitance superior to any of References 21–24, which contained said elements at another amount deviating from the invention.

Second Embodiment

An aluminum ingot having a purity of 99.99% and containing 0.002% of Si and 0.002% of Fe was used as a raw material. One or more elements were selected, as shown on Table 2, from a group consisting of: Cu, Zn, Mn, Ga, P, V, Ti, Cr, Ni, Ta, Zr, C, Be, Pb, In and rare-earth elements. After a predetermined amounts of each selected element was added to the aluminum ingot so as to give the 'contents' as shown in Table 2, the ingot for each example was melted and cast to form a sheet. The sheets were then hot-rolled, intermediate-annealed, rolled into foils 0.1 mm thick, washed and annealed in vacuum at 490° C. for 4 hours. Then, 'ion sputtering process' was carried out to apply predetermined amounts of the elements described above onto a surface of each foil. Subsequently, the foils were reheated in vacuum at 400° C. for 1 hour. These foils were used to prepare samples of the electrolytic condenser electrodes.

Thickness of the oxide layer 3 was measured for each sample, and ion intensity was measured in the direction of foil thickness to analyze the change in concentration of the sputtered elements. A maximum concentration 'P' was detected in an outermost surface region 7 formed in the oxide layer 3 and having a thickness of 5 Å or less. Concentration of said elements was found to decrease from said region 7 towards the foil body 2, but was constant within an inner layer 6 (deep from the outer surface of oxide layer 3 by 0.1 μm or more) of the foil body.

Ion intensity ratios of the maximum concentration in the surface region 7 to the concentration in the inner layer 6 and to the concentration on an interface disposed between the oxide layer 3 and foil body 2 were measured and calculated. Thickness of the oxide layer was measured according to the 'Hunter-Hall' method. Ion intensity was measured using a testing apparatus of the type 'IMA-S' made by Hitachi & Co., Ltd. Measurement was done with $Ar^+$ as the primary ion, with a beam diameter of 500 μm, at an acceleration voltage of 10 kV and with a current of 0.3 μA. Data obtained are listed in Table 2.

The raw foils were subjected to a first etching process at 85° C. for 60 seconds in an etching solution of 5% HCl and 15% $H_2SO_4$, with a current density of DC 20 A/dm². Then, the foils were etched again in a second etching process which was conducted at 85° C. for 8 minutes in another etching solution of 5% HCl and 0.1% oxalic acid, with a current density of DC 5 A/dm².

TABLE 2

|  | Elements in foil body | | Oxide layer | Ion intensity ratios | | Capacitance |
|---|---|---|---|---|---|---|
|  | (*1) | (ppm) | (Å) | $P_2/S_2$ (*2) | $P_2/Q_2$ (*3) | (%) |
| Examples |  |  |  |  |  |  |
| 31 | Cu | 22 | 40 | 12 | 10 | 106 |
| 32 | Zn | 48 | 43 | 29 | 27.5 | 102 |
| 33 | Mn | 41 | 41 | 21 | 19 | 101 |
| 34 | Ga | 24 | 38 | 23 | 20.3 | 104 |
| 35 | P | 14 | 46 | 18 | 17 | 105 |
| 36 | V | 22 | 44 | 22 | 20.1 | 103 |
| 37 | Cr | 13 | 44 | 4.2 | 3.8 | 102 |
| 38 | Ti | 14 | 45 | 3.7 | 3.5 | 106 |
| 39 | Ni | 11 | 43 | 8.4 | 8.1 | 107 |

TABLE 2-continued

|  |  | Elements in foil body |  | Oxide layer | Ion intensity ratios |  | Capacitance |
|---|---|---|---|---|---|---|---|
|  |  |  |  |  | $P_2/S_2$ | $P_2/Q_2$ |  |
|  |  | (*1) | (ppm) | (Å) | (*2) | (*3) | (%) |
| 40 |  | Ta | 15 | 47 | 7.2 | 6.9 | 105 |
| 41 |  | Zr | 21 | 41 | 8.3 | 7.1 | 104 |
| 42 |  | C | 19 | 48 | 9.9 | 8.8 | 103 |
| 43 |  | Be | 13 | 39 | 11.5 | 10.3 | 103 |
| 44 |  | P | 12 | 40 | 7.2 | 7 | 105 |
|  | and | V | 15 |  | 5.8 | 5.1 |  |
| 45 |  | Pb | 0.3 | 41 | 16 | 14.2 | 104 |
| 46 |  | In | 0.7 | 42 | 4.4 | 3.8 | 107 |
| 47 |  | Y | 0.4 | 41 | 15 | 14 | 106 |
| 48 |  | La | 0.5 | 39 | 13 | 11 | 102 |
| 49 |  | Ce | 0.6 | 45 | 8.8 | 7.6 | 104 |
| 50 |  | Pr | 0.3 | 46 | 5.3 | 4.5 | 105 |
|  | and | MM | 0.5 |  | 8.1 | 7 |  |
| References |  |  |  |  |  |  |  |
| 51 |  | Cu | 18 | 44 | 36 | 34.5 | 100 |
| 52 |  | V | 25 | 42 | 48 | 47 | 93 |
| 53 |  | Ni | 20 | 45 | 38 | 36.3 | 96 |
| 54 |  | Ni | 11 | 41 | 7.1 | 0.8 | 97 |

Notes:
(*1) MM = 'misch metal'
(*2) $P_2/S_2$ = outermost region/inner layer
(*3) $P_2/Q_2$ = outermost region/boundary The so-called 'forming treatment' of the etched foils was carried out with a voltage of 380 V. Capacitance of the finished foils was measured to give a result shown in Table 2, wherein capacitance is represented in percentage taking the value for the Reference 51 as 100%.

As will be seen from Table 2, each electrode foil containing, in the outermost surface region 7 of the oxide layer 3 formed on the foil body 2, one or more etching nuclei-forming elements at an amount defined in the invention had a capacitance superior to any of References 51–54, which contained said elements at another amount deviating from the invention.

Third Embodiment

An aluminum ingot having a purity of 99.99% and containing 0.002% of Si and 0.002% of Fe was used as a raw material. One or more elements were selected, as shown on Table 3, from a group consisting of: Cu, Zn, Mn, Ga, P, V, Ti, Cr, Ni, Ta, Zr, C, Be, B, Mg, Pb, In, Bi and rare-earth elements. After a predetermined amounts of each selected element was added to the aluminum ingot so as to give the 'contents' as shown in Table 1, the ingot for each example was melted and cast to form a sheet. The sheets were then hot-rolled, intermediate-annealed, rolled into foils 0.1 mm thick, washed and annealed in vacuum at 490° C. for 4 hours. Then, 'ion implantation process' was carried out to incorporate predetermined amounts of the element(s) described above into a boundary region 5, which region was located between a foil body 2 and an oxide layer 3. Further, another amount of the element was 'ion sputtered' onto the surface of the oxide layer, before re-heated in vacuum at 400° C. for 1 hour. These foils were used to prepare the electrolytic condenser electrodes.

Thickness of the oxide layer 3 was measured for each sample, and ion intensity was measured in the direction of foil thickness to analyze the change in concentration of the implanted and sputtered elements. A maximum concentration 'P' was detected in the boundary region 5 formed across an interface 4 and having a thickness of 5 Å or less, the interface being located between the foil body 2 and oxide layer 3. Another maximum 'P' was present in an outermost surface region 7 of the oxide layer, the region's thickness being also 5 Å or less. A lower concentration was found between the regions 5 and 7. Concentration of said elements was found to decrease from the boundary region 5 towards the foil body 2, but was constant within an inner layer 6 (deep from an outermost surface of oxide layer 3 by 0.1 μm or more) of the foil body.

Ion intensity ratios of the maximum concentration in the regions 5 and 7 to the concentration in the inner layer 6 and to the lower concentration between the regions 5 and 7 were measured and calculated. Thickness of the oxide layer was measured according to the 'Hunter-Hall' method. Ion intensity was measured using a testing apparatus of the type 'IMA-S' made by Hitachi & Co., Ltd. Measurement was done with Ar⁺ as the primary ion, with a beam diameter of 500 μm, at an acceleration voltage of 10 kV and with a current of 0.3 μA. Data obtained are listed in Table 3.

The raw foils were then subjected to a first etching process at 85° C. for 60 seconds in an etching solution of 5% HCl and 10% $H_2SO_4$, with a current density of DC 20 A/dm². Subsequently, the foils were etched again in a second etching process which was conducted at 85° C. for 8 minutes in another etching solution of 5% HCl and 0.1% oxalic acid, with a current density of DC 5 A/dm².

The so-called 'forming treatment' of the etched foils was carried out with a voltage of 380 V. Capacitance of the finished foils was measured to give a result shown in Table 3, wherein capacitance is represented in percentage taking the value for the Reference 85 as 100%.

As will be seen from Table 3, each electrode foil containing, in the boundary region 5 between the foil body 2 and the oxide layer 3 thereon and also in the outermost surface region 7 thereof, one or more etching nuclei-forming elements at an amount defined in the invention had a capacitance superior to any of References 84–87, which contained said elements at another amount deviating from the invention.

TABLE 3

| | Elements in foil body (*1) | | Oxide layer (Å) | Ion intensity ratios | | | | Capacitance (%) |
|---|---|---|---|---|---|---|---|---|
| | | (ppm) | | $P_3/S_3$ (*2) | $P_3/Q_3$ (*3) | $P_4/S_3$ (*4) | $P_4/Q_3$ (*5) | |

Examples

| | | | | | | | | |
|---|---|---|---|---|---|---|---|---|
| 61 | Cu | 20 | 40 | 13 | 8.7 | 15 | 10 | 107 |
| 62 | Zn | 48 | 39 | 27 | 18 | 24 | 16 | 102 |
| 63 | Mn | 40 | 43 | 21 | 14 | 27 | 18 | 102 |
| 64 | Ga | 23 | 43 | 23 | 15.3 | 14 | 9.3 | 105 |
| 65 | P | 16 | 41 | 19 | 12.7 | 6.4 | 4.3 | 104 |
| 66 | V | 24 | 39 | 21 | 14 | 8.7 | 5.8 | 105 |
| 67 | Cr | 12 | 45 | 3.6 | 2.4 | 19 | 12.7 | 102 |
| 68 | Ti | 15 | 46 | 2.8 | 1.9 | 6.4 | 4.3 | 106 |
| 69 | Ni | 12 | 49 | 8.6 | 5.7 | 7.7 | 5.1 | 109 |
| 70 | Ta | 15 | 49 | 6.5 | 4.3 | 6.8 | 4.5 | 107 |
| 71 | Zr | 10 | 38 | 7.2 | 4.8 | 7.8 | 5.2 | 106 |
| 72 | C | 24 | 41 | 11 | 7.3 | 9.5 | 6.3 | 104 |
| 73 | Be | 15 | 40 | 13 | 8.7 | 11.5 | 7.7 | 104 |
| 74 | B | 15 | 43 | 18 | 12 | 19 | 12.5 | 103 |
| 75 | Mg | 20 | 47 | 23 | 15.6 | 25 | 16.7 | 107 |
| 76 | P | 12 | 45 | 6.7 | 4.5 | 6.5 | 4.3 | 106 |
| and | V | 15 | | 4.1 | 2.7 | 3.7 | 2.5 | |
| 77 | Pb | 0.3 | 46 | 16 | 10.7 | 19 | 12.6 | 108 |
| 78 | In | 0.3 | 41 | 11 | 7.4 | 9.8 | 6.5 | 103 |
| 79 | Bi | 0.5 | 41 | 27 | 17.9 | 25 | 16.4 | 102 |
| 80 | Y | 0.5 | 43 | 21 | 14 | 13 | 8.7 | 106 |
| 81 | La | 0.4 | 39 | 15 | 10.2 | 16 | 10.7 | 104 |
| 82 | Ce | 0.3 | 38 | 15 | 10 | 13 | 8.8 | 104 |
| 83 | Pr | 0.3 | 44 | 5.1 | 3.4 | 5.8 | 3.9 | 103 |
| and | MM | 0.5 | | 4.6 | 3.1 | 4.6 | 3.0 | |

References

| | | | | | | | | |
|---|---|---|---|---|---|---|---|---|
| 84 | Cu | 20 | 45 | 38 | 25.3 | 19 | 12.7 | 100 |
| 85 | V | 25 | 41 | 51 | 34 | 27 | 18 | 91 |
| 86 | In | 0.7 | 39 | 29 | 19.3 | 46 | 31 | 94 |
| 87 | Ni | 12 | 47 | 1 | 0.7 | 1.1 | 0.7 | 88 |

Notes:
(*1) MM = 'misch metal'
(*2) $P_3/S_3$ = boundary/inner layer
(*3) $P_3/Q_3$ = boundary/minimum
(*4) $P_4/S_3$ = outermost region/inner layer
(*5) $P_4/Q_3$ = outermost region/minimum

What is claimed is:

1. An aluminum foil to be etched for use as the electrolytic condenser electrodes, said aluminum foil comprises a foil body and an oxide layer covering the foil body, said oxide layer is 20–70 Å thick and formed due to contact of the foil body with an oxidizing atmosphere, wherein the foil body comprises 99.9% by weight or more of Al as well as a concentration of at least one etching nuclei-forming element selected from a group consisting of Cu, Zn, Mn, Ga, P, V, Ti, Cr, Ni, Ta, Zr, C, Be, Pb, In, and rare-earth elements, wherein a maximum concentration of the element is present in a boundary region having a thickness of about 20 Å or less and said boundary region being formed across the interface between the foil body and the oxide layer, so that the concentration of said element decreases from the boundary region towards the foil body and towards the oxide layer, and being uniform throughout an inner layer of the foil, the inner layer being the remainder of the foil from which an upper portion of the foil body and the oxide layer are subtracted, wherein said upper portion is adjacent to the oxide layer, and said subtracted foil body upper portion and oxide layer amounting to 0.1 μm in depth measured from the outer surface of the oxide layer, and wherein the ion intensity ratio of the maximum concentration of the nuclei-forming element to the concentration thereof in the inner layer is 1.2–30, and the ion intensity ratio of the maximum concentration of the nuclei-forming element to the concentration of said element on the outer surface of the oxide layer is higher than 1.0 but 20 or less.

2. An aluminum foil to be etched for use as the electrolytic condenser electrodes as defined in claim 1, wherein the nuclei-forming element is one or more of Cu, Zn, Mn and Ga, and 3–60 ppm of them are contained in the inner layer of the foil body.

3. An aluminum foil to be etched for use as the electrolytic condenser electrodes as defined in claim 1, wherein the nuclei-forming element is one or more of P, V, Ti, Cr, Ni, Ta, Zr, C and Be, and 1–40 ppm of them are contained in the inner layer of the foil body.

4. An aluminum foil to be etched for use as the electrolytic condenser electrodes as defined in claim 1, wherein the nuclei-forming element is one or more of Pb, In and rare-earth elements, and 0.01–3 ppm of them are contained in the inner layer of the foil body.

5. An aluminum foil to be etched for use as the electrolytic condenser electrodes, said aluminum foil comprises a foil body and an oxide layer covering the foil body, said oxide layer is 20–70 Å thick and formed due to contact of the foil body with an oxidizing atmosphere, wherein the foil body comprises 99.9% by weight or more of Al as well as a concentration of at least one nuclei-forming element selected from a group consisting of Cu, Zn, Mn, Ga, P, V, Ti, Cr, Ni, Ta, Zr, C, Be, Pb, In and rare-earth elements, wherein a maximum concentration of the element is present in an outermost surface region of the oxide layer, said outermost surface region having a thickness of about 20 Å or less, and wherein the concentration of said elements decreases from the outermost surface region towards the foil body and being uniform throughout an inner layer of the boil, the inner layer being the remainder of the foil from which an upper portion of the foil body and the oxide layer are subtracted, wherein said upper portion is adjacent to the oxide layer and said subtracted foil body upper portion and oxide layer amounting to 0.1 μm in depth measured from the outer surface of the oxide layer, and wherein the ion intensity ratio of the maximum concentration of the nuclei-forming element to the concentration thereof in the inner layer is 1.2–30, and the ion intensity ratio of the maximum concentration of the nuclei-forming element to the concentration of said element on an interface disposed between the oxide layer and the foil body is 1.1–28.

6. An aluminum foil to be etched for use as the electrolytic condenser electrodes as defined in claim 5, wherein the nuclei-forming element is one or more of Cu, Zn, Mn and Ga, and 3–60 ppm of them are contained in the inner layer of the foil body.

7. An aluminum foil to be etched for use as the electrolytic condenser electrodes as defined in claim 5, wherein the nuclei-forming element is one or more of P, V, Ti, Cr, Ni, Ta, Zr, C and Be, and 1–40 ppm of them are contained in the inner layer of the foil body.

8. An aluminum foil to be etched for use as the electrolytic condenser electrodes as defined in claim 5, wherein the nuclei-forming element is one or more of Pb, In and rare-earth elements, and 0.01–3 ppm of them are contained in the inner layer of the foil body.

9. An aluminum foil to be etched for use as the electrolytic condenser electrodes, said aluminum foil comprises a foil body and an oxide layer covering the foil body, said oxide layer is 20–70 Å thick and formed due to contact of the foil body with an oxidizing atmosphere, wherein the foil body comprises 99.9% by weight or more of Al as well as a concentration of at least one nuclei-forming element selected from a group consisting of Cu, Zn, Mn, Ga, P, V, Ti, Cr, Ni, Ta, Zr, C, Be, B, Mg, Pb, In, Bi and rare-earth elements, wherein a first peak concentration of the element is present in a boundary region having thickness of about 20 Å or less and said boundary region being formed across the interface of the foil body and the oxide layer, and a second peak concentration being present in an outermost surface region of the oxide layer, said outermost surface region having a thickness of about 20 Å or less, wherein the concentration of said element being present between said outermost surface region and the boundary region is lower than each peak concentration, the concentration of said element also decreases from the boundary region towards the foil body and being uniform throughout an inner layer of the foil, the inner layer being the remainder of the foil from which an upper portion of the foil body and the oxide layer are subtracted wherein said upper portion is adjacent to the oxide layer and said subtracted foil body upper portion and oxide layer amounting to 0.1 μm in depth measured from an outer surface of the oxide layer, and wherein an ion intensity ratio of each peak concentration of the nuclei-forming element to the concentration thereof in the inner layer is 1.2–30, and the ion intensity ratio of each peak concentration of the nuclei-forming element to the lower concentration is 1.1–20.

10. An aluminum foil to be etched for use as the electrolytic condenser electrodes as defined in claim 9, wherein the nuclei-forming element is one or more of Cu, Zn, Mn and Ga, and 3–60 ppm of them are contained in the inner layer of the foil body.

11. An aluminum foil to be etched for use as the electrolytic condenser electrodes as defined in claim 9, wherein the nuclei-forming element is one or more of P, V, Ti, Cr, Ni, Ta, Zr, C, Be, B and Mg, and 1–40 ppm of them are contained in the inner layer of the foil body.

12. An aluminum foil to be etched for use as the electrolytic condenser electrodes as defined in claim 9, wherein the nuclei-forming element is one or more of Pb, In, Bi and rare-earth elements, and 0.01–3 ppm of them are contained in the inner layer of the foil body.

* * * * *